(12) United States Patent
Sun et al.

(10) Patent No.: US 12,732,406 B2
(45) Date of Patent: Sep. 8, 2026

(54) SRS ENHANCEMENT TO SUPPORT MORE THAN 4 LAYER CODEBOOK BASED UPLINK TRANSMISSION

(71) Applicant: APPLE INC., Cupertino, CA (US)

(72) Inventors: Haitong Sun, Cupertino, CA (US); Huaning Niu, San Jose, CA (US); Hong He, San Jose, CA (US); Dawei Zhang, Saratoga, CA (US); Wei Zeng, San Diego, CA (US); Yushu Zhang, Beijing (CN); Jie Cui, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1 day.

(21) Appl. No.: 18/858,626

(22) PCT Filed: Apr. 27, 2023

(86) PCT No.: PCT/US2023/066294
§ 371 (c)(1),
(2) Date: Oct. 21, 2024

(87) PCT Pub. No.: WO2023/212642
PCT Pub. Date: Nov. 2, 2023

(65) Prior Publication Data

US 2026/0205336 A1 Jul. 16, 2026

Related U.S. Application Data

(60) Provisional application No. 63/363,779, filed on Apr. 28, 2022.

(51) Int. Cl.
*H04L 27/26* (2006.01)

(52) U.S. Cl.
CPC ........ *H04L 27/2607* (2013.01); *H04L 27/261* (2013.01)

(58) Field of Classification Search
CPC ..... H04W 24/02; H04W 24/08; H04W 16/14; H04W 72/0453; H04W 16/10;
(Continued)

(56) References Cited

U.S. PATENT DOCUMENTS

2010/0034312 A1* 2/2010 Muharemovic ...... H04B 7/0417 375/267
2021/0112498 A1 4/2021 Duan et al.
(Continued)

FOREIGN PATENT DOCUMENTS

WO 2018126987 A1 7/2018
WO 2021034250 A1 2/2021

OTHER PUBLICATIONS

PCT/US2023/066294, International Search Report and Written Opinion, Aug. 2, 2023, 21 pages.

*Primary Examiner* — Eva Y Puente
(74) *Attorney, Agent, or Firm* — Dorsey & Whitney LLP

(57) ABSTRACT

Embodiments herein provide sounding reference signals (SRS) enhancements to support more than four layers of codebook based uplink operation (e.g., 6 and 8 layer uplink operation). To support 6 and 8 layer SRS uplink operation, some embodiments herein use multiple SRS Comb offsets. Some embodiments propose an increase maximum number of SRS cyclic shifts. Some embodiments use a flexible SRS cyclic shift selection.

9 Claims, 9 Drawing Sheets

600

RECEIVE A TRANSMISSION FROM A NETWORK NODE INCLUDING CONFIGURATION DETAILS FOR SOUNDING REFERENCE SIGNALS (SRS) FOR EIGHT PORTS, WHEREIN THE CONFIGURATION DETAILS MAP THE EIGHT PORTS TO MULTIPLE COMB OFFSETS AND ONE OR MORE CYCLIC SHIFTS 602

ENCODE SRS TRANSMISSIONS FOR THE EIGHT PORTS ACCORDING TO THE CONFIGURATION DETAILS 604

SEND, TO THE NETWORK NODE, THE SRS TRANSMISSIONS VIA THE EIGHT PORTS, WHEREIN THE SRS TRANSMISSIONS ARE ORTHOGONALLY TRANSMITTED USING THE MULTIPLE COMB OFFSETS AND THE ONE OR MORE CYCLIC SHIFTS 606

(58) Field of Classification Search
CPC . H04W 16/18; H04W 24/04; H04W 72/1268; H04L 41/0893; H04L 41/0894; H04L 41/16; H04L 1/1671; H04L 43/16; H04L 5/0023; H04L 5/0053; H04L 5/0064; H04B 7/0413; H04B 7/0623; H04B 7/0426; H04B 7/068; H04B 7/0686; H04B 7/2643; H04B 1/06; H04B 7/2656
See application file for complete search history.

(56) References Cited

U.S. PATENT DOCUMENTS

2023/0275737 A1* 8/2023 Chen .................... H04L 5/0048
370/329
2023/0318768 A1* 10/2023 Khoshnevisan ....... H04B 1/713
370/329
2023/0336390 A1* 10/2023 Abdelghaffar ......... H04B 1/713
2024/0259158 A1* 8/2024 Wang .................. H04B 7/0404

* cited by examiner

| $K_{TC}$ | $n_{SRS}^{cs,max}$ |
|---|---|
| 2 | 8 |
| 4 | 12 |
| 8 | 6 |

| SRS port | Cyclic Shift | Comb offset | Note |
|---|---|---|---|
| Port 0 | n_CS | k_TC | In SRS-Resource configuration k_TC is "combOffset" n_CS is "cyclicShift" Port index can be permuted |
| Port 1 | n_CS | (k_TC + 2) mod 4 | |
| Port 2 | (n_CS+3) mod 12 | k_TC | |
| Port 3 | (n_CS+3) mod 12 | (k_TC + 2) mod 4 | |
| Port 4 | (n_CS+6) mod 12 | k_TC | |
| Port 5 | (n_CS+6) mod 12 | (k_TC + 2) mod 4 | |
| Port 6 | (n_CS+9) mod 12 | k_TC | |
| Port 7 | (n_CS+9) mod 12 | (k_TC + 2) mod 4 | |

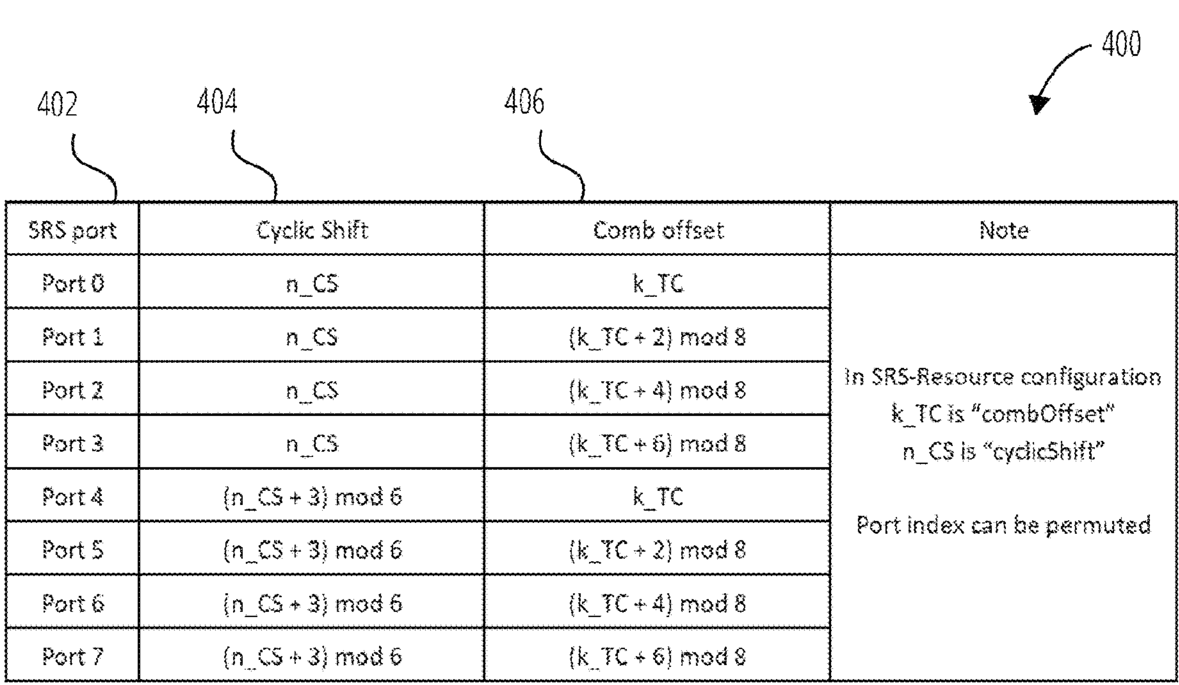

| SRS port | Cyclic Shift | Comb offset | Note |
|---|---|---|---|
| Port 0 | n_CS | k_TC | In SRS-Resource configuration k_TC is "combOffset" n_CS is "cyclicShift" Port index can be permuted |
| Port 1 | n_CS | (k_TC + 2) mod 8 | |
| Port 2 | n_CS | (k_TC + 4) mod 8 | |
| Port 3 | n_CS | (k_TC + 6) mod 8 | |
| Port 4 | (n_CS + 3) mod 6 | k_TC | |
| Port 5 | (n_CS + 3) mod 6 | (k_TC + 2) mod 8 | |
| Port 6 | (n_CS + 3) mod 6 | (k_TC + 4) mod 8 | |
| Port 7 | (n_CS + 3) mod 6 | (k_TC + 6) mod 8 | |

| SRS port | Cyclic Shift | Comb offset | Note |
|---|---|---|---|
| Port 0 | n_CS | k_TC | In SRS-Resource configuration k_TC is "combOffset" n_CS is "cyclicShift" Port index can be permuted |
| Port 1 | n_CS | (k_TC + 1) mod 8 | |
| Port 2 | n_CS | (k_TC + 2) mod 8 | |
| Port 3 | n_CS | (k_TC + 3) mod 8 | |
| Port 4 | n_CS | (k_TC + 4) mod 8 | |
| Port 5 | n_CS | (k_TC + 5) mod 8 | |
| Port 6 | n_CS | (k_TC + 6) mod 8 | |
| Port 7 | n_CS | (k_TC + 7) mod 8 | |

FIG. 5

RECEIVE A TRANSMISSION FROM A NETWORK NODE INCLUDING CONFIGURATION DETAILS FOR SOUNDING REFERENCE SIGNALS (SRS) FOR EIGHT PORTS, WHEREIN THE CONFIGURATION DETAILS MAP THE EIGHT PORTS TO MULTIPLE COMB OFFSETS AND ONE OR MORE CYCLIC SHIFTS 602

ENCODE SRS TRANSMISSIONS FOR THE EIGHT PORTS ACCORDING TO THE CONFIGURATION DETAILS 604

SEND, TO THE NETWORK NODE, THE SRS TRANSMISSIONS VIA THE EIGHT PORTS, WHEREIN THE SRS TRANSMISSIONS ARE ORTHOGONALLY TRANSMITTED USING THE MULTIPLE COMB OFFSETS AND THE ONE OR MORE CYCLIC SHIFTS 606

FIG. 6

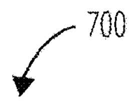

ENCODE A TRANSMISSION INCLUDING CONFIGURATION DETAILS FOR SOUNDING REFERENCE SIGNALS (SRS) FOR EIGHT PORTS, WHEREIN THE CONFIGURATION DETAILS MAP THE EIGHT PORTS TO MULTIPLE COMB OFFSETS AND ONE OR MORE CYCLIC SHIFTS 702

SEND THE TRANSMISSION TO A UE AND TRIGGERING SRS TRANSMISSIONS 704

RECEIVE, FROM THE UE, THE SRS TRANSMISSIONS VIA THE EIGHT PORTS, WHEREIN THE SRS TRANSMISSIONS ARE ORTHOGONAL BASED ON THE MULTIPLE COMB OFFSETS AND THE ONE OR MORE CYCLIC SHIFTS 706

FIG. 7

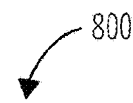

ENCODE A TRANSMISSION INCLUDING CONFIGURATION DETAILS FOR SOUNDING REFERENCE SIGNALS (SRS) FOR MORE THAN FOUR PORTS, WHEREIN THE CONFIGURATION DETAILS INCLUDE ONE OR BOTH OF A CONFIGURABLE STEP SIZE OF A CYCLIC SHIFT INCREMENT FOR CYCLIC SHIFT TO SRS PORT MAPPING, AND MULTIPLE COMB OFFSETS SUPPORTING AN UN-EQUAL NUMBER OF PORTS 802

SEND THE TRANSMISSION TO A UE AND TRIGGER SRS TRANSMISSIONS 804

RECEIVE, FROM THE UE, THE SRS TRANSMISSIONS ACCORDING TO THE COMB CONFIGURATION, THE COMB OFFSET, AND THE CONFIGURABLE MAXIMUM NUMBER OF CYCLIC SHIFTS 806

FIG. 8

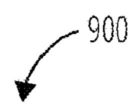

ENCODE A TRANSMISSION INCLUDING CONFIGURATION DETAILS FOR SOUNDING REFERENCE SIGNALS (SRS) FOR SIX PORTS OR EIGHT PORTS, WHEREIN THE CONFIGURATION DETAILS INCLUDE ONE OR BOTH OF A CONFIGURABLE STEP SIZE OF A CYCLIC SHIFT INCREMENT FOR CYCLIC SHIFT TO SRS PORT MAP, AND MULTIPLE COMB OFFSETS SUPPORTING AN UN-EQUAL NUMBER OF PORTS 902

SEND THE TRANSMISSION TO A UE AND TRIGGERING SRS TRANSMISSIONS 904

RECEIVE, FROM THE UE ON THE SIX PORTS OR EIGHT PORTS, THE SRS TRANSMISSIONS ACCORDING TO THE CONFIGURATION DETAILS 906

FIG. 9

SRS ENHANCEMENT TO SUPPORT MORE THAN 4 LAYER CODEBOOK BASED UPLINK TRANSMISSION

TECHNICAL FIELD

This application relates generally to wireless communication systems, including enhancements for supporting sounding reference signals on more than four ports.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

as a function of comb structure ($K_{TC}$) as designated by a NR standard.

Figure 3:
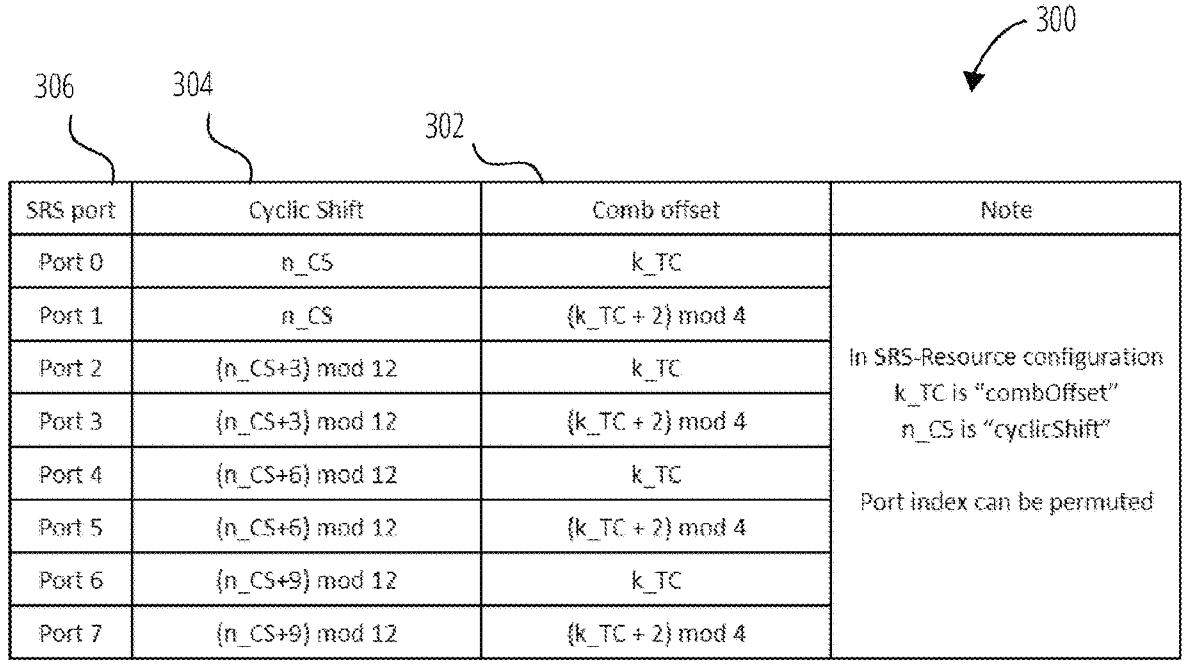

FIG. 3 illustrates a table with multiple comb offsets to support eight port SRS with comb 4 in accordance with one embodiment.

FIG. 4 illustrates a table with multiple comb offsets to support eight port SRS with comb 8 in accordance with one embodiment.

FIG. 5 illustrates another way that 8 ports may be supported with comb 8.

FIG. 6 illustrates a method for a UE for SRS transmissions via multiple ports in accordance with one embodiment.

FIG. 7 illustrates a method for a network node to configure and receive an SRS from more than four ports in accordance with one embodiment.

FIG. 8 illustrates a method for a network node to configure and receive an SRS from more than four ports (e.g., six ports or eight ports) using a configurable maximum number of cyclic shifts in accordance with one embodiment.

FIG. 9 illustrates a method for a network node to support an SRS on six or eight ports using a flexible SRS cyclic shift selection in accordance with one embodiment.

Figure 10:
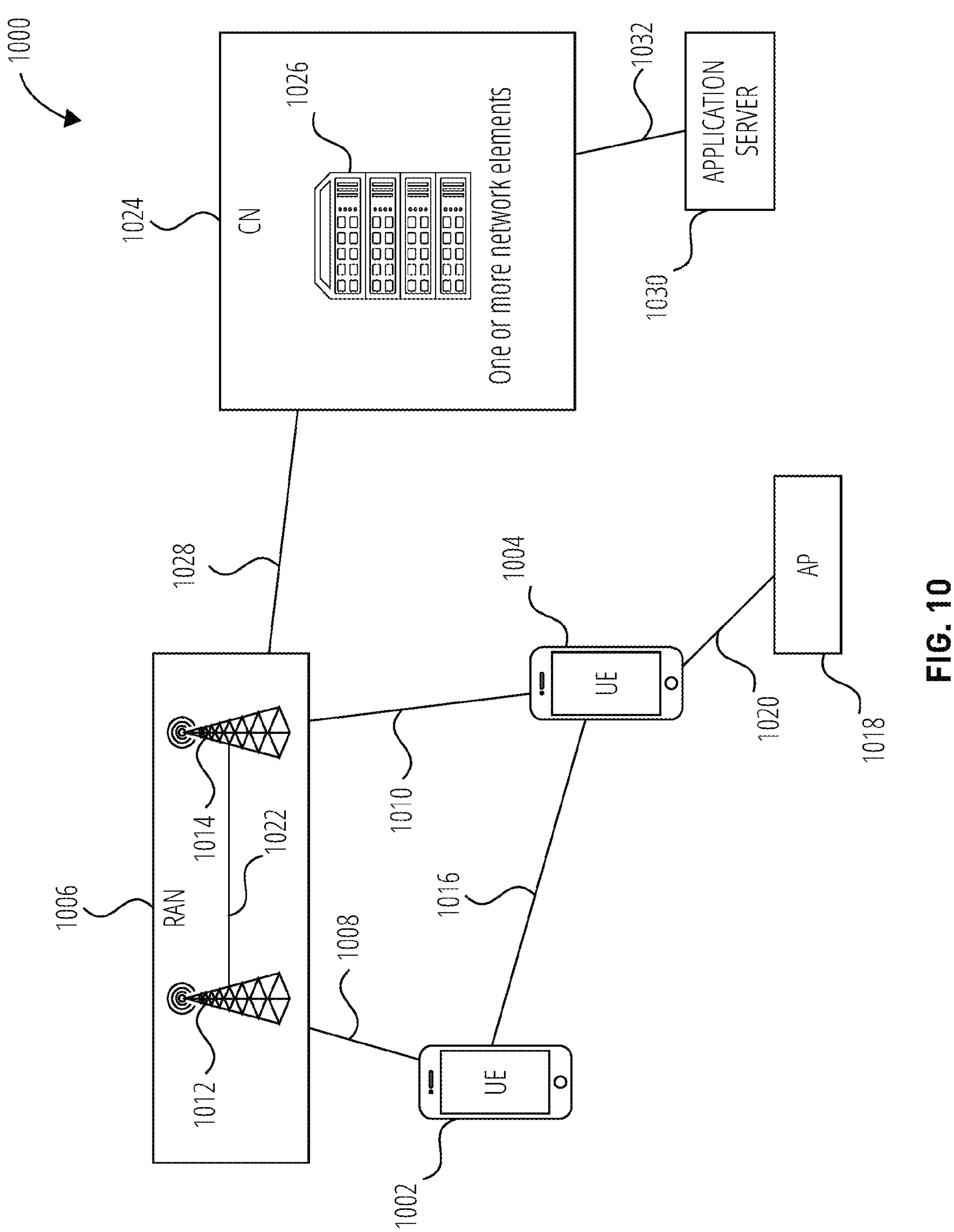

FIG. 10 illustrates an example architecture of a wireless communication system, according to embodiments disclosed herein.

Figure 11:
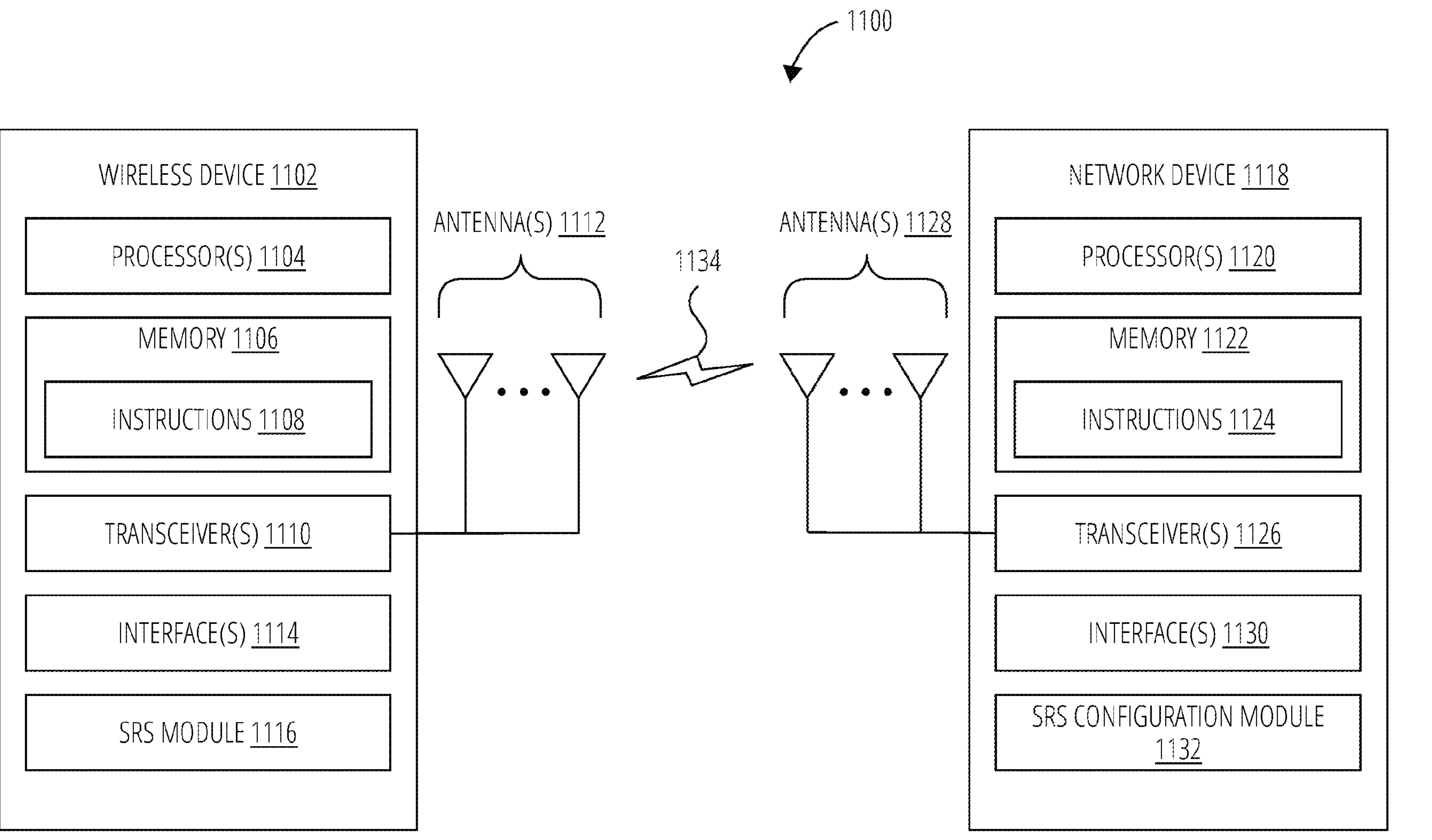

FIG. 11 illustrates a system for performing signaling between a wireless device and a network device, according to embodiments disclosed herein.

DETAILED DESCRIPTION

Various embodiments are described with regard to a user equipment (UE). However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Many wireless communication standards provide for the use of known signals (e.g., pilot or reference signals) for a variety of purposes, such as synchronization, measurements, equalization, control, etc. For example, in cellular wireless communications, sounding reference signals (SRS) may be used to estimate uplink channel quality. A wireless communication device or mobile device (i.e., UE) can transmit an SRS to a base station (e.g., eNB for LTE and gNB for NR). SRS gives information about the combined effect of multipath fading, scattering, Doppler and power loss of transmitted signal.

Using the SRS, the base station may estimate the channel quality and manage resources accordingly. For example, since the reference signals include data known to both the transmitter and the receiver, the receiver may use the reference signal to determine/identify various characteristics of the communication channel. This is commonly referred to as channel estimation, which is used in many high-end wireless communications such as LTE and 5G-NR communications. Known channel properties of a communication link in wireless communications are referred to as channel state information (CSI), which provides information indicative of the combined effects of, for example, scattering, fading, and power decay with distance. The CSI makes it possible to adapt transmissions to current channel conditions, which is useful for achieving reliable communications with high data rates in multi-antenna systems.

Oftentimes multi-antenna systems use precoding for improved communications. Precoding is an extension of beamforming to support multi-stream (or multi-layer) transmissions for multi-antenna wireless communications and is used to control the differences in signal properties between the respective signals transmitted from multiple antennas by modifying the signal transmitted from each antenna according to a precoding matrix. In one sense, precoding may be considered a process of cross coupling the signals before transmission (in closed loop operation) to equalize the demodulated performance of the layers. The precoding matrix is generally selected from a codebook that defines multiple precoding matrix candidates, wherein a precoding matrix candidate is typically selected according to a desired performance level based on any of a number of different factors such as current system configuration, communication environment, and/or feedback information from the receiver receiving the transmitted signal(s).

The feedback information may be used in selecting a precoding matrix candidate by defining the same codebook at both the transmitter and the receiver, and using the feedback information from the receiver as an indication of a preferred precoding matrix. Similarly, the feedback information may be used in selecting preferred ports for UE transmission.

An SRS design may include symbol location, repetition, comb, and cyclic shift. In NR Release-15 (Rel-15), a design for the SRS was outlined. In Rel-15, SRS can only be transmitted in the last 6 symbols of each slot. Further, the SRS can be repeated up to four symbols, and the SRS supports Comb 2/4.

NR Release-16 (Rel-16) provided enhancements for the SRS of Rel-15. In Rel-16, the SRS could be transmitted in any symbol in a slot. Further SRS supported repetition with 8 and 12 symbols.

NR Release-17 (Rel-17) provided further enhancements for SRS. For example, Rel-17 supported RB-level Partial Frequency Sounding (RPFS). For RPFS, Rel-17 supports start PRB location hopping. Rel-17 also supports SRS repetition with 10/14 symbols. Further, Rel-17 supported Comb 8. For Comb 8, Rel-17 supported a maximum of 6 cyclic shifts (CS).

Additionally, currently NR only support a maximum of 4 ports for SRS. NR uplink currently supports two multi-user multiple-in multiple-out (MIMO) operation modes and only supports up to 4 layers. Because SRS is an uplink reference signal, one of the purposes of the SRS is for MIMO operation. There are two modes of uplink operation, a Codebook based uplink and a non-Codebook based uplink.

For Codebook based uplink, the SRS resource set usage may be set equal to "codebook." The UE transmits SRS resource with multiple ports, and the network schedules PUSCH by indicating the selected SRS resource indicator (SRI), transmit precoding matrix (TPMI) and the rank indication (RI).

For non-Codebook based uplink the SRS resource set usage may be set equal to "nonCodebook." The UE transmits multiple SRS resources, each with a single port. The network schedules PUSCH by indicating the SRS resource and port selection.

In certain communication systems (e.g., Rel-18 NR), it may be desirable to provide SRS enhancements to support more than four layers of codebook based uplink operation (e.g., 6 and 8 layer uplink operation). To support more than 4 layers for codebook based uplink operation, some embodiments herein use multiple SRS Comb offsets. Some embodiments propose an increase maximum number of SRS cyclic shifts. Some embodiments use a flexible SRS cyclic shift selection.

Figure 1:
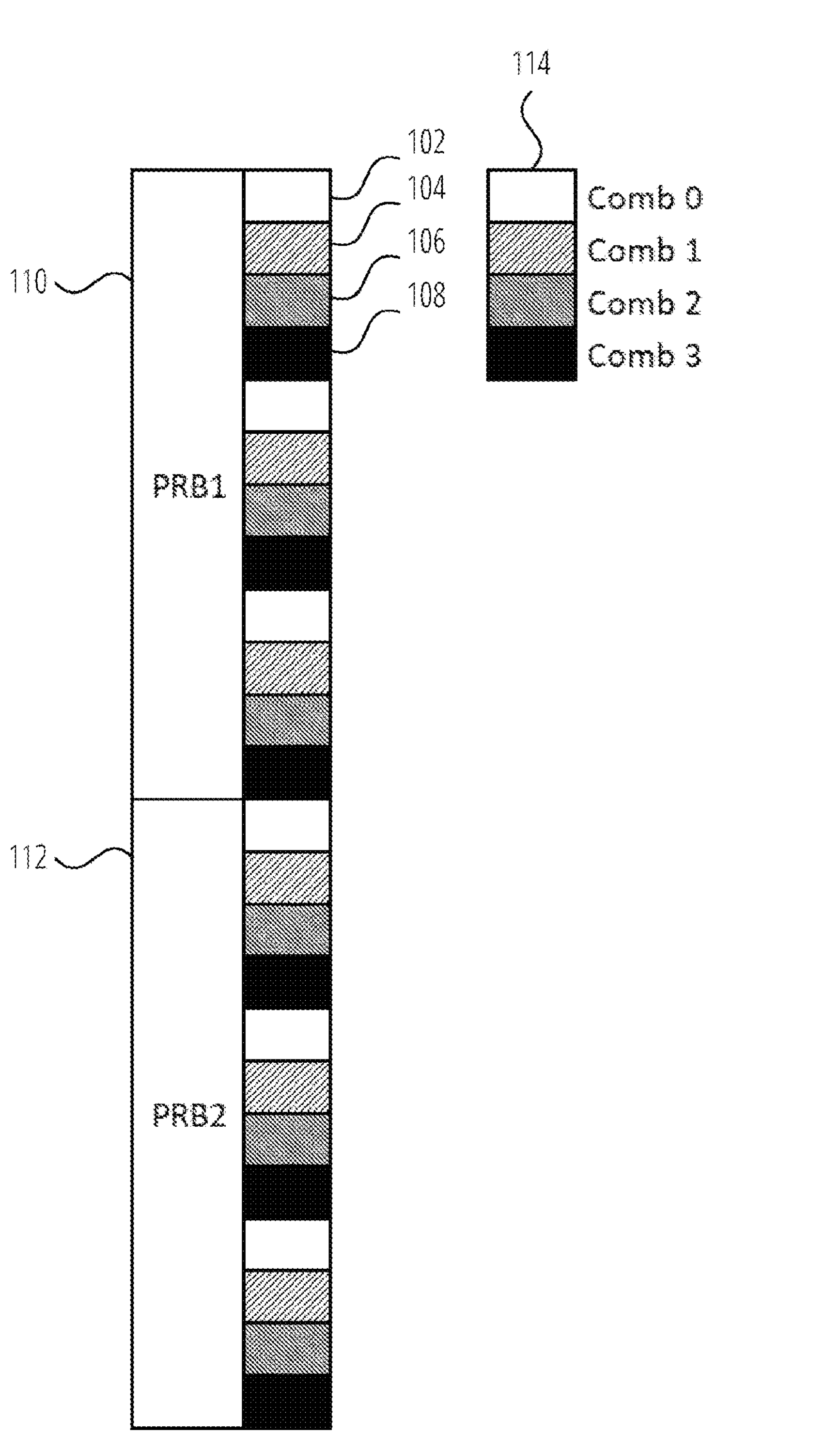
FIG. 1 illustrates SRS sequence mapping for an uplink transmission in accordance with one embodiment.

FIG. 1 illustrates SRS sequence mapping for an uplink transmission 100. As shown, the uplink transmission 100 includes a number of resource elements (REs) (e.g., first RE 102, second RE 104, third RE 106, and fourth RE 108). A RE is a frequency-time unit to which an SRS sequence is mapped. The uplink transmission 100 further comprises multiple physical resource blocks (PRBs) (e.g., PRB1 110 and PRB2 112) comprising a plurality of contiguous REs. The SRS sequence may support a length of 6, 12, 18, 24, and any sequence greater than or equal to 36.

To support multiple ports and UEs, a comb structure for the uplink transmission 100 may be used. An SRS sequence may be mapped to the frequency domain resources (e.g., first RE 102, second RE 104, third RE 106, and fourth RE 108) with the comb structure. NR currently supports comb 2, 4, and 8 for SRS. A comb 2 structure would case an SRS to transmit every other RE. FIG. 1 illustrates a comb 4 structure. As shown, in a comb 4 structure, the SRS sequences are transmitted every four resource elements. This provides for four possible comb offsets 114. The comb offsets indicate the starting frequency of the comb structure for an SRS sequence. Similarly, an 8 comb structure would cause an SRS to transmit every eighth resource element. Transmitting according to a comb structure allows ports from the same UE or different UEs to transmit an SRS sequence without interfering with other SRS sequences.

Another way for SRS transmissions to not interfere with other SRS transmissions is to apply multiple cyclic shift sequence on top of a same SRS sequence. The cyclic shift allows multiple transmission to be applied on the same frequency RE by overlapping orthogonal sequences. Thus, a wireless communication system may use comb structure and cyclic shift to increase its capacity. A length M cyclic shift sequence can have M orthogonal sequences. Thus, a length M cyclic shift can be used to create M orthogonal SRS sequence using the same SRS comb.

Figure 2:
FIG. 2 illustrates a table that indicates a maximum number of cyclic shifts $$\left(n_{SRS}^{cs,max}\right)$$

FIG. 2 illustrates a table 200 that indicates a maximum number of cyclic shifts $$(n_{SRS}^{cs,max})$$

as a function of comb structure ($K_{TC}$) as designated by a NR standard. For each comb structure there is a defined number of cyclic shifts in the NR standards. This determines how many SRS patterns can be used. For example, there are 8 cyclic shifts for a comb 2 structure resulting in 16 (i.e., 2*8=16) ports or UEs that can be supported. As shown, in some embodiments, a Comb 2 has maximum 8 cyclic shifts, a Comb 4 has maximum 12 cyclic shifts, and a Comb 8 has maximum 6 cyclic shifts.

However, one of the issues with supporting more than four ports is how the cyclic shifts are currently selected. The cyclic shifts are chosen so that the cyclic shifts have equal distance between them. This requirement for equal distance may limit support for supporting four or more ports. For example, for maximum cyclic shift you can support four ports that may be possible with comb 2 and 4 because four can be evenly divided into the number of cyclic shifts (4 and 6). However, four ports could not be divided evenly into the six cyclic shifts of the 8. Similarly, eight ports could not be supported by either comb 4 or comb 8.

Some embodiments herein use multiple SRS comb offsets to support more than four ports. For example, FIGS. 3-5 illustrate how multiple SRS comb offsets may be used to support eight ports while maintaining the design shown in table 200 and maintaining an equal distance between ports.

FIG. 3 illustrates a table 300 with multiple comb offsets 302 to support 8 port SRS with comb 4 while maintaining a maximum number of cyclic shifts for Comb 4 as shown in FIG. 2 (e.g., maximum cyclic shift is 12). The variable K_TC in the comb offsets 114 column is a comb offset from the SRS-Resource configuration. Similarly, the variable n_CS in the cyclic shifts 304 column is the cyclic shift from the SRS-Resource configuration. The port index in the SRS ports 306 column can be permuted based on the configuration (e.g., Port 7 may align with the first row).

To support 8 port SRS the illustrated embodiment uses two comb offsets 302, and for every comb offset the UE sends SRS on 4 ports. So while the maximum 12 cyclic shifts of comb 4 (from table 200) is not evenly dividable by the 8 ports, the embodiment splits the ports into two comb offsets 302 to make two groups of 4 ports which can evenly divide the 12 cyclic shifts.

As shown, the table 300 includes eight SRS ports 306 with equally spaced cyclic shifts 304 using two comb offsets 302 of the comb 4 structure. Specifically, ports 0, 2, 4, and 6 are located in comb offset k_TC. Further, ports 0, 2, 4, and 6 may be orthogonally transmitted using a cyclic shift of (n_CS+0) mod 12, (n_CS+3) mod 12, (n_CS+6) mod 12, and (n_CS+9) mod 12 respectively. The remaining four ports may be transmitted in a different comb offset to avoid interference. In some embodiments, the comb offset is selected so that the transmissions are evenly spaced along the available frequency resource elements. For instance, in the illustrated embodiment, ports 1, 3, 5, and 7 are located in comb offset (k_TC+2) mod 4. Further, ports 1, 3, 5, and 7 may be orthogonally transmitted using a cyclic shift of (n_CS+0) mod 12, (n_CS+3) mod 12, (n_CS+6) mod 12, and (n_CS+9) mod 12 respectively.

In this embodiment, the SRS for each of the two groups of four ports are evenly sampled across the cyclic shift sequence by a step size of three. Further, the two groups have an even distance between comb offsets (e.g., the groups are shifted by a factor of two).

Similarly, FIG. 4 illustrates a table 400 with multiple comb offsets 302 to support eight port SRS with comb 8 while maintaining a maximum number of cyclic shifts for Comb 8 as shown in FIG. 2 (e.g., maximum cyclic shift is six). With a maximum of six cyclic shifts, it is not possible to support the eight ports using only cyclic shift.

Instead, the illustrated embodiment samples the 8 comb offset 406 every two offsets to provide four possible orthogonal patterns. Further, the illustrated embodiment samples the cyclic shift 404 every third shift to provide two orthogonal patterns per comb offset. This results in a total of 8 orthogonal values. Specifically, ports 0 and 4 are located in in comb offset k_TC. Further, ports 0 and 4 may be orthogonally transmitted using a cyclic shift of (n_CS+0) mod 6 and (n_CS+3) mod 6, respectively. Ports 1 and 5 are located in in comb offset (k_TC+2) mode 8. Further, ports 1 and 5 may be orthogonally transmitted using a cyclic shift of (n_CS+0) mod 6 and (n_CS+3) mod 6, respectively. Ports 2 and 6 are located in in comb offset (k_TC+4) mode 8. Further, ports 2 and 6 may be orthogonally transmitted using a cyclic shift of (n_CS+0) mod 6 and (n_CS+3) mod 6, respectively. Ports 3 and 7 are located in in comb offset (k_TC+6) mode 8. Further, ports 2 and 6 may be orthogonally transmitted using a cyclic shift of (n_CS+0) mod 6 and (n_CS+3) mod 6, respectively.

While the illustrated embodiments lists the SRS port index 402 in the order of zero through seven, the SRS port index 402 may be permutated regarding which port index is mapped to which row of the cyclic shift 404 and comb offset 406.

FIG. 5 is another way that eight ports may be supported with comb 8 while maintaining a maximum number of cyclic shift for Comb 8 as shown in FIG. 2 (e.g., maximum cyclic shift is six). In this embodiment, the table 500 uses a same cyclic shift 504 and multiple comb offsets 502 to provide eight orthogonal values for the eight ports shown in the SRS port index 506.

As shown, to support the eight ports, all eight possible comb offsets may be used. In the illustrated embodiment, ports 0, 1, 2, 3, 4, 5, 6, and 7 all have the same cyclic shift 504 (e.g., n_CS). Further, ports 0, 1, 2, 3, 4, 5, 6, and 7 are located in comb offset (k_TC+0) mod 8, (k_TC+1) mod 8, (k_TC+2) mod 8, (k_TC+3) mod 8, (k_TC+4) mod 8, (k_TC+5) mod 8, (k_TC+6) mod 8, (k_TC+7) mod 8, respectively.

While the illustrated embodiments lists the SRS port index 506 in the order of zero through seven, the SRS port index 506 may be permutated regarding which port index is mapped to which row of the cyclic shift 504 and comb offset 502.

FIG. 6 is a flow chart of a method 600 for a UE for SRS transmissions via multiple ports. As shown, the UE may receive 602 a transmission from a network node including configuration details for SRS for eight ports. The configuration details may map the eight ports to multiple comb offsets and one or more cyclic shifts. The UE may encode 604 SRS transmissions for the eight ports according to the configuration details. The UE may send 606, to the network node, the SRS transmissions via the eight ports, wherein the SRS transmissions are orthogonally transmitted using the multiple comb offsets and the one or more cyclic shifts. The SRS port mapping to cyclic shift and comb offset for the SRS transmissions may be configured according to any of the embodiments shown in FIGS. 3-5.

Embodiments contemplated herein include an apparatus comprising means to perform one or more elements of the method 600. This apparatus may be, for example, an apparatus of a UE (such as a wireless device 1102 that is a UE, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a UE (such as a memory 1106 of a wireless device 1102 that is a UE, as described herein).

Embodiments contemplated herein include an apparatus comprising logic, modules, or circuitry to perform one or more elements of the method 600. This apparatus may be, for example, an apparatus of a UE (such as a wireless device 1102 that is a UE, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a UE (such as a wireless device 1102 that is a UE, as described herein).

Embodiments contemplated herein include a signal as described in or related to one or more elements of the method 600.

Embodiments contemplated herein include a computer program or computer program product comprising instructions, wherein execution of the program by a processor is to cause the processor to carry out one or more elements of the method 600. The processor may be a processor of a UE (such as a processor(s) 1104 of a wireless device 1102 that is a UE, as described herein). These instructions may be, for example, located in the processor and/or on a memory of the UE (such as a memory 1106 of a wireless device 1102 that is a UE, as described herein).

FIG. 7 is a flowchart of a method 700 for a network node for receiving SRS transmissions from multiple ports. The network node may encode 702 a transmission including configuration details for SRS for eight ports. The configuration details may map the eight ports to multiple comb offsets and one or more cyclic shifts. The network node may send 704 the transmission to a UE and trigger SRS transmissions. The network node may receive 706, from the UE, the SRS transmissions via the eight ports, wherein the SRS transmissions are orthogonal based on the multiple comb offsets and the one or more cyclic shifts. The SRS port mapping to cyclic shift and comb offset for the SRS transmissions may be configured according to any of the embodiments shown in FIGS. 3-5.

FIG. 8 illustrates a method 800 for a network node to configure and receive an SRS from more than four ports (e.g., six ports or eight ports) using a configurable maximum number of cyclic shifts. A network node may encode 802 a transmission that includes configuration details for SRS for more than four ports. The configuration details may include a comb configuration, a comb offset, and a variable indicates a value of a configurable maximum number of cyclic shifts for the comb configuration. The network node may further send 804 the transmission to a UE and trigger SRS transmissions. The UE may encode SRS transmissions to be sent according to the configuration details and send the SRS transmissions using the ports. The network node may receive 806, from the UE, the SRS transmissions according to the comb configuration, the comb offset, and the configurable maximum number of cyclic shifts.

For example, it may be desirable to support six port SRS with comb 2. As shown in table 200 of FIG. 2, the current standard for comb 2 is configured with a maximum number of eight cyclic shifts for the two comb offsets. Unfortunately, six ports do not factorize into the eight cyclic shifts and the two comb offsets. Accordingly, to facilitate the six port SRS, some embodiments may alter the static maximum number of cyclic shifts from table 200 to a configurable value.

For example, the network node may be able to configure the maximum number of cyclic shifts to be six or a multiple of six to support six port SRS. In some embodiments, the network may be allowed to configure the maximum number of cyclic shifts for comb 2 to be six $$\left(\text{i.e., } n_{SRS}^{cs,max} = 6\right)$$

to support six port SRS. The UE then may use all the cyclic shifts, (i.e., cyclic shift 0, 1, 2, 3, 4, and 5), in a same SRS Comb to support six port SRS. In other words, when the network sets the cyclic shift to six, each of the ports may be mapped to a different cyclic shift on the same comb.

Additionally, in some embodiments, the cyclic shift may be configured to change to other values to support different numbers of ports (e.g., eight to support eight ports). In some embodiments, the configurable maximum number of cyclic shifts may be combined with the use of multiple comb offsets.

In some embodiments, the network may be allowed to configure the maximum number of cyclic shifts for comb 2 to be twelve $$\left(\text{i.e., } n_{SRS}^{cs,max} = 12\right)$$

to support six port SRS. In these embodiments, six cyclic shifts with equal distance from each other and located in the same SRS Comb may be used to support six port SRS. The network may configure the UE with the cyclic shifts starting offset. For instance, the six port SRS may be supported with either even or odd cyclic shifts. In other words, the SRS transmission from the six ports may either use cyclic shift 0, 2, 4, 6, 8, and 10 or cyclic shift 1, 3, 5, 7, 9, and 11.

In some embodiments, the configurable maximum number of cyclic shifts may be used to support eight port SRS with comb 4 and/or comb 8. For example, the network node may be able to configure the maximum number of cyclic shifts to be eight or a multiple of eight to support eight port SRS. This may allow the network to support eight port SRS with comb 4 and comb 8. Without the configurable maximum number of cyclic shifts, the static values shown in table 200 of FIG. 2 for comb 4 and comb 8 (i.e., maximum number of cyclic shifts=6 and 12) are not divisible by eight ports. The additional ability to configure the maximum number of cyclic shifts may allow values that can be used to evenly space the eight port SRS.

In some embodiments, the network node may be allowed to configure maximum number of 8 cyclic shifts $$\left(\text{i.e., } n_{SRS}^{cs,max} = 8\right)$$

to support eight port SRS. The UE then may use all the cyclic shifts, (i.e., cyclic shift 0, 1, 2, 3, 4, 5, 6, and 7), in a same SRS Comb to support eight port SRS. In other words, when the network sets the cyclic shift to eight, each of the ports may be mapped to a different cyclic shift on the same comb. Compared to the current design, setting the maximum number of cyclic shifts to eight may not support SRS sequence length of 6 and 12. Accordingly, the network node may change the cyclic shift value to six and twelve if desired.

In some embodiments, the network node may be allowed to configure maximum number of 24 cyclic shifts $$\left(\text{i.e., } n_{SRS}^{cs,max} = 24\right)$$

to support eight port SRS. In these embodiments, eight cyclic shifts with equal distance from each other and located in the same SRS Comb may be used to support eight port SRS. The network may configure the UE with the cyclic shifts starting offset. For instance, the eight port SRS may be supported with cyclic shift (0,3,6,9,12,15,18,21), cyclic shift (1,4,7,10,13,16,19,22) or cyclic shift (2,5,8,11,14,17,20,23). Compared to the current design, setting the maximum number of cyclic shifts to 24 may not support SRS sequence length of 6 and 12. Accordingly, the network node may change the cyclic shift value to six and twelve if desired.

FIG. 9 illustrates a flow chart of a method 900 for a network node to support SRS on six or eight ports using a flexible SRS cyclic shift selection. In some embodiments, a flexible SRS cyclic shift selection may be used to support 6 port SRS and 8 port SRS. A flexible SRS cyclic shift selection method may include one or both of a configurable step size of the cyclic shift increment for cyclic shift to SRS port mapping, and using multiple comb offsets that support a different number of ports. These embodiments may have a non-uniform distribution of the ports in the cyclic shift domain. In other words, the cyclic shift and/or the number of ports on each comb offset may be heterogeneous.

In some of the embodiments discussed above, cyclic shift spacing is chosen such that the SRS transmissions are evenly spaced. This may assist in reducing interference between SRS transmissions as closer sequences may be less robust to frequency offset error. However, evenly dividing the cyclic shift domain requires that the maximum number of cyclic shifts is dividable by the number of ports. This limits the ability of the network to support some combination of ports.

To add additional flexibility, a configurable step size may be introduced in some embodiments. The configurable step size may allow greater flexibility in the number of ports that can be supported by different comb structures.

As shown, a network node may encode 902 a transmission including configuration details for SRS for six ports or eight ports. The configuration details may include one or both of a configurable step size of a cyclic shift increment for cyclic shift to SRS port maps, and multiple comb offsets supporting an un-equal number of ports. The network node may send 904 the transmission to a UE and triggering SRS transmissions. The UE may encode SRS transmissions to be sent according to the configuration details and send the SRS transmissions using the ports. The network node may receive 906, from the UE on the six ports or eight ports, the SRS transmissions according to the configuration details. The following are embodiments of configuration details for SRS transmissions using such a flexible SRS cyclic shift selection.

In some embodiments, to support more than four ports for SRS, the step size of the cyclic shift increment for cyclic shift to SRS port mapping can be additionally configured. For example, the cyclic shift to SRS port mapping determined using:

$$(n\_CS + i\square CS\_step) \bmod CS\_max$$

where:

n_CS is cyclic Shift from an SRS-Resource configuration information element;

CS max is a maximum number of cyclic shifts;

CS_step is the configurable step size; and i is a port number.

A flexible SRS cyclic shift selection may be used to support six port SRS with Comb 2, and maintaining a maximum number of cyclic shifts of eight. In some embodiments, multiple comb offsets with an unequally divided number of ports between the comb offsets may be used to support six port SRS with Comb 2 with a maximum number of cyclic shifts of eight. For instance, a first comb offset supporting four ports with a cyclic shift distance of two, and a second comb offset supporting two ports with a cyclic shift distance of four may be used The four ports on the first comb offset may be associated with either cyclic shifts (0, 2, 4, and 6) or cyclic shifts (1, 3, 5, and 7).

In some embodiments, a single comb offset is used for the SRS transmissions to support six port SRS with Comb 2 with a maximum number of cyclic shifts of eight. For example, of the eight cyclic shifts, two cyclic shifts with a distance of four may not be used to support the SRS transmissions, and the remaining six cyclic shifts may be used to support the SRS transmissions. For example, the ports may use cyclic shifts (1, 2, 3, 5, 6, and 7), cyclic shifts (0, 2, 3, 4, 6, and 7), cyclic shifts (0, 1, 3, 4, 5, and 7), or cyclic shifts (0, 1, 2, 4, 5, and 6).

A flexible SRS cyclic shift selection may be used to support eight port SRS with Comb 4 while maintaining a maximum number of cyclic shifts of twelve. In some embodiments, multiple comb offsets with an unequally divided number of ports between the comb offsets may be used to support eight port SRS with Comb 4 while maintaining a maximum number of cyclic shifts of twelve. For example, a first comb offset may support six ports with a cyclic shift distance of two, and a second comb offset supporting two ports with a cyclic shift distance of six. The six ports supported on the first comb offset may be associated with either cyclic shifts (0, 2, 4, 6, 8 and 10) or cyclic shifts (1, 3, 5, 7, 9, and 11). The two ports supported on the second comb offset may be associated with cyclic shifts (0 and 6), cyclic shifts (1 and 7), cyclic shifts (2 and 8), cyclic shifts (3 and 9), cyclic shifts (4 and 10), or cyclic shifts (4 and 11).

In some embodiments, a single comb offset is used for the SRS transmissions to support eight port SRS with Comb 4 while maintaining a maximum number of cyclic shifts of twelve. For example, of the twelve cyclic shifts, four cyclic shifts with a distance of three may not be used to support the SRS transmissions, and the remaining eight cyclic shifts may be used to support the SRS transmissions. For example, the ports may use cyclic shifts (1, 2, 4, 5, 7, 8, 10, and 11), cyclic shifts (0, 2, 3, 5, 6, 8, 9, and 11), or cyclic shifts (0, 1, 3, 4, 6, 7, 9, and 10).

A flexible SRS cyclic shift selection may be used to support eight port SRS with Comb 8 while maintaining a maximum number of cyclic shifts of six. For example, in some embodiments, a first comb offset may support six ports with all cyclic shifts of the first comb offset, and a second comb offset may support two ports with a cyclic shift distance of three (e.g., cyclic shift (0 and 3), cyclic shifts (1 and 4), or cyclic shifts (2 and 5)).

Embodiments contemplated herein include an apparatus comprising means to perform one or more elements of the method 700, method 800, and method 900. This apparatus may be, for example, an apparatus of a base station (such as a network device 1118 that is a base station, as described herein).

Embodiments contemplated herein include one or more non-transitory computer-readable media comprising instructions to cause an electronic device, upon execution of the instructions by one or more processors of the electronic device, to perform one or more elements of the method 700, method 800, and method 900. This non-transitory computer-readable media may be, for example, a memory of a base station (such as a memory 1122 of a network device 1118 that is a base station, as described herein).

Embodiments contemplated herein include an apparatus comprising logic, modules, or circuitry to perform one or more elements of the method 700, method 800, and method 900. This apparatus may be, for example, an apparatus of a base station (such as a network device 1118 that is a base station, as described herein).

Embodiments contemplated herein include an apparatus comprising: one or more processors and one or more computer-readable media comprising instructions that, when executed by the one or more processors, cause the one or more processors to perform one or more elements of the method 700, method 800, and method 900. This apparatus may be, for example, an apparatus of a base station (such as a network device 1118 that is a base station, as described herein).

Embodiments contemplated herein include a signal as described in or related to one or more elements of the method 700, method 800, and method 900.

Embodiments contemplated herein include a computer program or computer program product comprising instructions, wherein execution of the program by a processing element is to cause the processing element to carry out one or more elements of the method 700, method 800, and method 900. The processor may be a processor of a base station (such as a processor(s) 1120 of a network device 1118 that is a base station, as described herein). These instructions may be, for example, located in the processor and/or on a memory of the base station (such as a memory 1122 of a network device 1118 that is a base station, as described herein).

FIG. 10 illustrates an example architecture of a wireless communication system 1000, according to embodiments disclosed herein. The following description is provided for an example wireless communication system 1000 that operates in conjunction with the LTE system standards and/or 5G or NR system standards as provided by 3GPP technical specifications.

As shown by FIG. 10, the wireless communication system 1000 includes UE 1002 and UE 1004 (although any number of UEs may be used). In this example, the UE 1002 and the UE 1004 are illustrated as smartphones (e.g., handheld touchscreen mobile computing devices connectable to one or more cellular networks), but may also comprise any mobile or non-mobile computing device configured for wireless communication.

The UE 1002 and UE 1004 may be configured to communicatively couple with a RAN 1006. In embodiments, the RAN 1006 may be NG-RAN, E-UTRAN, etc. The UE 1002 and UE 1004 utilize connections (or channels) (shown as connection 1008 and connection 1010, respectively) with the RAN 1006, each of which comprises a physical communications interface. The RAN 1006 can include one or more base stations, such as base station 1012 and base station 1014, that enable the connection 1008 and connection 1010.

In this example, the connection 1008 and connection 1010 are air interfaces to enable such communicative coupling, and may be consistent with RAT(s) used by the RAN 1006, such as, for example, an LTE and/or NR.

In some embodiments, the UE 1002 and UE 1004 may also directly exchange communication data via a sidelink interface 1016. The UE 1004 is shown to be configured to access an access point (shown as AP 1018) via connection 1020. By way of example, the connection 1020 can comprise a local wireless connection, such as a connection consistent with any IEEE 802.11 protocol, wherein the AP 1018 may comprise a Wi-Fi® router. In this example, the AP 1018 may be connected to another network (for example, the Internet) without going through a CN 1024.

In embodiments, the UE 1002 and UE 1004 can be configured to communicate using orthogonal frequency division multiplexing (OFDM) communication signals with each other or with the base station 1012 and/or the base station 1014 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1012 or base station 1014 may be implemented as one or more software entities running on server computers as part of a virtual network. In addition, or in other embodiments, the base station 1012 or base station 1014 may be configured to communicate with one another via interface 1022. In embodiments where the wireless communication system 1000 is an LTE system (e.g., when the CN 1024 is an EPC), the interface 1022 may be an X2 interface. The X2 interface may be defined between two or more base stations (e.g., two or more eNBs and the like) that connect to an EPC, and/or between two eNBs connecting to the EPC. In embodiments where the wireless communication system 1000 is an NR system (e.g., when CN 1024 is a 5GC), the interface 1022 may be an Xn interface. The Xn interface is defined between two or more base stations (e.g., two or more gNBs and the like) that connect to 5GC, between a base station 1012 (e.g., a gNB) connecting to 5GC and an eNB, and/or between two eNBs connecting to 5GC (e.g., CN 1024).

The RAN 1006 is shown to be communicatively coupled to the CN 1024. The CN 1024 may comprise one or more network elements 1026, which are configured to offer various data and telecommunications services to customers/subscribers (e.g., users of UE 1002 and UE 1004) who are connected to the CN 1024 via the RAN 1006. The components of the CN 1024 may be implemented in one physical device or separate physical devices including components to read and execute instructions from a machine-readable or computer-readable medium (e.g., a non-transitory machine-readable storage medium).

In embodiments, the CN 1024 may be an EPC, and the RAN 1006 may be connected with the CN 1024 via an S1 interface 1028. In embodiments, the S1 interface 1028 may be split into two parts, an S1 user plane (S1-U) interface, which carries traffic data between the base station 1012 or base station 1014 and a serving gateway (S-GW), and the S1-MME interface, which is a signaling interface between the base station 1012 or base station 1014 and mobility management entities (MMEs).

In embodiments, the CN 1024 may be a 5GC, and the RAN 1006 may be connected with the CN 1024 via an NG interface 1028. In embodiments, the NG interface 1028 may be split into two parts, an NG user plane (NG-U) interface, which carries traffic data between the base station 1012 or base station 1014 and a user plane function (UPF), and the S1 control plane (NG-C) interface, which is a signaling interface between the base station 1012 or base station 1014 and access and mobility management functions (AMFs).

Generally, an application server 1030 may be an element offering applications that use internet protocol (IP) bearer resources with the CN 1024 (e.g., packet switched data services). The application server 1030 can also be configured to support one or more communication services (e.g., VoIP sessions, group communication sessions, etc.) for the UE 1002 and UE 1004 via the CN 1024. The application server 1030 may communicate with the CN 1024 through an IP communications interface 1032.

FIG. 11 illustrates a system 1100 for performing signaling 1134 between a wireless device 1102 and a network device 1118, according to embodiments disclosed herein. The system 1100 may be a portion of a wireless communications system as herein described. The wireless device 1102 may be, for example, a UE of a wireless communication system. The network device 1118 may be, for example, a base station (e.g., an eNB or a gNB) of a wireless communication system.

The wireless device 1102 may include one or more processor(s) 1104. The processor(s) 1104 may execute instructions such that various operations of the wireless device 1102 are performed, as described herein. The processor(s) 1104 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1102 may include a memory 1106. The memory 1106 may be a non-transitory computer-readable storage medium that stores instructions 1108 (which may include, for example, the instructions being executed by the processor(s) 1104). The instructions 1108 may also be referred to as program code or a computer program. The memory 1106 may also store data used by, and results computed by, the processor(s) 1104.

The wireless device 1102 may include one or more transceiver(s) 1110 that may include radio frequency (RF) transmitter and/or receiver circuitry that use the antenna(s) 1112 of the wireless device 1102 to facilitate signaling (e.g., the signaling 1134) to and/or from the wireless device 1102 with other devices (e.g., the network device 1118) according to corresponding RATs.

The wireless device 1102 may include one or more antenna(s) 1112 (e.g., one, two, four, or more). For embodiments with multiple antenna(s) 1112, the wireless device 1102 may leverage the spatial diversity of such multiple antenna(s) 1112 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1102 may be accomplished according to precoding (or digital beamforming) that is applied at the wireless device 1102 that multiplexes the data streams across the antenna(s) 1112 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1102 may implement analog beamforming techniques, whereby phases of the signals sent by the antenna(s) 1112 are relatively adjusted such that the (joint) transmission of the antenna(s) 1112 can be directed (this is sometimes referred to as beam steering).

The wireless device 1102 may include one or more interface(s) 1114. The interface(s) 1114 may be used to provide input to or output from the wireless device 1102. For example, a wireless device 1102 that is a UE may include interface(s) 1114 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1110/antenna(s) 1112 already described) that allow for communication between the UE and other devices and may operate according to known protocols (e.g., Wi-Fi®, Bluetooth®, and the like).

The wireless device 1102 may include an SRS module 1116. The SRS module 1116 may be implemented via hardware, software, or combinations thereof. For example, the SRS module 1116 may be implemented as a processor, circuit, and/or instructions 1108 stored in the memory 1106 and executed by the processor(s) 1104. In some examples, the SRS module 1116 may be integrated within the processor(s) 1104 and/or the transceiver(s) 1110. For example, the SRS module 1116 may be implemented by a combination of software components (e.g., executed by a DSP or a general processor) and hardware components (e.g., logic gates and circuitry) within the processor(s) 1104 or the transceiver(s) 1110.

The SRS module 1116 may be used for various aspects of the present disclosure, for example, aspects of FIGS. 1-10. The SRS module 1116 is configured to send SRS based on configurations from the network device 1118.

The network device 1118 may include one or more processor(s) 1120. The processor(s) 1120 may execute instructions such that various operations of the network device 1118 are performed, as described herein. The processor(s) 1120 may include one or more baseband processors implemented using, for example, a CPU, a DSP, an ASIC, a controller, an FPGA device, another hardware device, a firmware device, or any combination thereof configured to perform the operations described herein.

The network device 1118 may include a memory 1122. The memory 1122 may be a non-transitory computer-readable storage medium that stores instructions 1124 (which may include, for example, the instructions being executed by the processor(s) 1120). The instructions 1124 may also be referred to as program code or a computer program. The memory 1122 may also store data used by, and results computed by, the processor(s) 1120.

The network device 1118 may include one or more transceiver(s) 1126 that may include RF transmitter and/or receiver circuitry that use the antenna(s) 1128 of the network device 1118 to facilitate signaling (e.g., the signaling 1134) to and/or from the network device 1118 with other devices (e.g., the wireless device 1102) according to corresponding RATs.

The network device 1118 may include one or more antenna(s) 1128 (e.g., one, two, four, or more). In embodiments having multiple antenna(s) 1128, the network device 1118 may perform MIMO, digital beamforming, analog beamforming, beam steering, etc., as has been described.

The network device 1118 may include one or more interface(s) 1130. The interface(s) 1130 may be used to provide input to or output from the network device 1118. For example, a network device 1118 that is a base station may include interface(s) 1130 made up of transmitters, receivers, and other circuitry (e.g., other than the transceiver(s) 1126/antenna(s) 1128 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1118 may include an SRS configuration module 1132. The SRS configuration module 1132 may be implemented via hardware, software, or combinations thereof. For example, the SRS configuration module 1132 may be implemented as a processor, circuit, and/or instructions 1124 stored in the memory 1122 and executed by the processor(s) 1120. In some examples, the SRS configuration module 1132 may be integrated within the processor(s) 1120 and/or the transceiver(s) 1126. For example, the SRS configuration module 1132 may be implemented by a combination of software components (e.g., executed by a DSP or a general processor) and hardware components (e.g., logic gates and circuitry) within the processor(s) 1120 or the transceiver(s) 1126.

The SRS configuration module 1132 may be used for various aspects of the present disclosure, for example, aspects of FIGS. 1-10. The SRS configuration module 1132 is configured to configure SRS transmissions from the wireless device 1102.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a UE, the method comprising:

receiving a transmission from a network node including configuration details for sounding reference signals (SRS) for eight ports, wherein the configuration details map the eight ports to multiple comb offsets and one or more cyclic shifts, encoding SRS transmissions for the eight ports according to the configuration details; and sending, to the network node, the SRS transmissions via the eight ports, wherein the SRS transmissions are orthogonally transmitted using the multiple comb offsets and the one or more cyclic shifts, wherein the SRS transmissions are sent using comb 4, wherein the SRS transmission is sent using two comb offsets that are equally spaced, and using equally spaced cyclic shifts within the two comb offsets, wherein each comb offset is used by four of the eight ports.

2. The method of claim 1, wherein the one or more cyclic shifts of the SRS transmissions are evenly spaced.

3. The method of claim 1, wherein the configuration details further comprise a comb offset value and a cyclic shift value, wherein the eight port are mapped to the multiple comb offsets and the one or more cyclic shifts based on the comb offset value and the cyclic shift value.

4. A method for a network node, the method comprising:

encoding a transmission including configuration details for sounding reference signals (SRS) for more than four ports, wherein the configuration details include a comb configuration, a comb offset, and a variable indicating a value of a configurable maximum number of cyclic shifts for the comb configuration, wherein the configuration details are for an eight port SRS with comb 4, two comb offsets that are equally spaced, equally spaced cyclic shifts within the two comb offsets, wherein each comb offset is used by four of the eight ports;

sending the transmission to a UE and triggering SRS transmissions; and receiving, from the UE, the SRS transmissions according to the comb configuration, the comb offset, and the configurable maximum number of cyclic shifts.

5. The method of claim 4, wherein the configurable maximum number of cyclic shifts is set to eight.

6. The method of claim 4, wherein the configurable maximum number of cyclic shifts is set to 24.

7. A UE apparatus comprising:

a processor; and a memory storing instructions that, when executed by the processor, configure the apparatus to:

receive a transmission from a network node including configuration details for sounding reference signals (SRS) for eight ports, wherein the configuration details map the eight ports to multiple comb offsets and one or more cyclic shifts, encode SRS transmissions for the eight ports according to the configuration details; and send, to the network node, the SRS transmissions via the eight ports, wherein the SRS transmissions are orthogonally transmitted using the multiple comb offsets and the one or more cyclic shifts, wherein the SRS transmissions are sent using comb 4, wherein the SRS transmission is sent using two comb offsets that are equally spaced, and using equally spaced cyclic shifts within the two comb offsets, wherein each comb offset is used by four of the eight ports.

8. The UE apparatus of claim 7, wherein the one or more cyclic shifts of the SRS transmissions are evenly spaced.

9. The UE apparatus of claim 7, wherein the configuration details further comprise a comb offset value and a cyclic shift value, wherein the eight port are mapped to the multiple comb offsets and the one or more cyclic shifts based on the comb offset value and the cyclic shift value.

* * * * *